United States Patent
Elkovitch et al.

(10) Patent No.: US 7,534,374 B2
(45) Date of Patent: May 19, 2009

(54) INJECTION MOLDED ARTICLE AND COMPOSITION FOR THE PREPARATION THEREOF

(75) Inventors: Mark Elkovitch, Selkirk, NY (US); Alex Dimitri Sokolowski, Albany, NY (US)

(73) Assignee: Sabic Innovative Plastics IP B.V. (NL)

( * ) Notice: Subject to any disclaimer, the term of this patent is extended or adjusted under 35 U.S.C. 154(b) by 112 days.

(21) Appl. No.: 11/845,845

(22) Filed: Aug. 28, 2007

(65) Prior Publication Data

US 2009/0057624 A1 Mar. 5, 2009

(51) Int. Cl.
*H01B 1/24* (2006.01)

(52) U.S. Cl. ...................................... 252/511; 428/922

(58) Field of Classification Search ................. 252/511; 264/104, 105; 524/147; 428/922, 923
See application file for complete search history.

(56) References Cited

U.S. PATENT DOCUMENTS

| | | | |
|---|---|---|---|
| 3,354,129 A | 11/1967 | Edmonds et al. | |
| 3,919,177 A | 11/1975 | Campbell | |
| 4,021,596 A | 5/1977 | Bailey | |
| 4,565,684 A | 1/1986 | Tibbetts et al. | |
| 4,572,813 A | 2/1986 | Arakawa | |
| 4,663,230 A | 5/1987 | Tennent | |
| 4,769,424 A | 9/1988 | Takekoshi et al. | |
| 4,794,164 A | 12/1988 | Iwasaki et al. | |
| 4,816,289 A | 3/1989 | Komatsu et al. | |
| 4,876,078 A | 10/1989 | Arakawa et al. | |
| 5,024,818 A | 6/1991 | Tibbetts et al. | |
| 5,165,909 A | 11/1992 | Tennent et al. | |
| 5,290,881 A | 3/1994 | Dekkers | |
| 5,504,165 A | 4/1996 | Brown et al. | |
| 5,589,152 A | 12/1996 | Tennent et al. | |
| 5,591,382 A | 1/1997 | Nahass et al. | |
| 5,612,401 A | 3/1997 | Brown et al. | |
| 5,837,758 A | 11/1998 | Brown et al. | |
| 6,221,283 B1 * | 4/2001 | Dharmarajan et al. | ....... 252/511 |
| 6,303,708 B1 | 10/2001 | Brown et al. | |
| 7,173,090 B2 | 2/2007 | Akiyama et al. | |
| 7,439,284 B2 * | 10/2008 | Alger et al. | ................. 523/351 |

OTHER PUBLICATIONS

Japanese Patent Publication No. 2005-105024, 1 page, abstract only, Apr. 2005.

Japanese Patent Publication No. 2007-169521, 1 page, abstract only, Jul. 2007.

ASTM D 3359-02, "Standard Test Methods for Measuring Adhesion by Tape Test", 7 pages.

ASTM D 6095-6, Standard Test Method for Longitudinal Measurement of Volume Resistivity for Extruded Crosslinked and Thermoplastic Semiconducting Conductor and Insulation Shielding Materials, 3 pages.

(Continued)

*Primary Examiner*—Mark Kopec
(74) *Attorney, Agent, or Firm*—Cantor Colburn LLP (57) ABSTRACT

A composition containing particular amounts of a poly (arylene ether), a poly(arylene sulfide), an electrically conductive carbon black, and glass fibers is particularly useful for molding heat-resistant articles suitable for electrostatic painting. Compared to a corresponding composition without the poly(arylene ether), the composition exhibits improved paint attraction and markedly improved paint adhesion, and it allows the use of a lower level of conductive carbon black to achieve the same electrical conductivity. The composition thus provides an excellent balance of impact strength, electrical conductivity, and paint attraction and adhesion.

21 Claims, 1 Drawing Sheet

OTHER PUBLICATIONS

Ketjenblack ® EC, "Rubber & Plastics Processing Chemicals Electroconductive Carbon Black", Akzo Chemie, 9 pages.

Ketjenblack ® EC-300J, Akzo Nobel Polymer Chemicals, 2005, 2 pages.

Ketjenblack ® EC-600JD, Akzo Nobel Polymer Chemicals, 2006, 2 pages.

Cabot Corporation, "The Fundamentals of Carbon Black", 2 pages.

J.D. van Drumpt, "Developments in conductive carbon blacks", Plastics Compounding, 1988, 4 pages.

* cited by examiner

Before:

After:

Figure 1

INJECTION MOLDED ARTICLE AND COMPOSITION FOR THE PREPARATION THEREOF

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

Blends of poly(arylene ether) with poly(arylene sulfide) are known. See, for example, U.S. Pat. No. 4,021,596 to Bailey, U.S. Pat. No. 5,290,881 to Dekkers, and U.S. Pat. Nos. 5,504,165 and 5,837,758 to Brown et al. Such blends benefit from the increased heat resistance and solvent resistance of poly(arylene sulfide) relative to poly(arylene ether). However, it has been difficult to formulate conductive carbon black-containing blends suitable for electrostatic painting, also known as powder coating. Specifically, when the conductive carbon black content is increased to improve paint attraction, the impact strength of the composition is compromised. And even when sufficient paint attraction is achieved, the post-curing paint adhesion is inadequate. There is therefore a need for poly(arylene sulfide)/poly(arylene ether) compositions that provide an improved balance of impact strength, paint attraction, and paint adhesion.

BRIEF DESCRIPTION OF THE INVENTION

The above-described and other drawbacks are alleviated by an injection molded article, comprising: a product of injection molding a composition comprising 5 to 25 weight percent of a poly(arylene ether), 35 to 63 weight percent of a poly (arylene sulfide), 1.7 to 5 weight percent of an electrically conductive carbon black, and 20 to 50 weight percent of glass fibers; wherein all weight percents are based on the total weight of the composition; wherein the weight ratio of electrically conductive carbon black to poly(arylene sulfide) is at least 0.048; and wherein the composition exhibits a volume resistivity less than or equal to 1,000,000 ohm-centimeters, measured at 23° C. according to ASTM D6095, a paint adhesion rating of at least 3 B measured according to ASTM D3359, Method B, and an unnotched Izod impact strength of at least 150 Joules/meter, measured at 23° C. according to ASTM D256.

Another embodiment is a painted injection molded article, comprising: a product of injection molding a composition comprising 8 to 15 weight percent of a poly(arylene ether), 40 to 50 weight percent of a poly(arylene sulfide), 2 to 3 weight percent of an electrically conductive carbon black, and 35 to 45 weight percent of glass fibers; wherein all weight percents are based on the total weight of the composition; wherein the weight ratio of electrically conductive carbon black to poly (arylene sulfide) is 0.048 to 0.07; and wherein the composition exhibits a volume resistivity of 100 to 100,000 ohm-centimeters, measured at 23° C. according to ASTM D6095, a paint adhesion rating of 3 B or 4 B or 5 B measured according to ASTM D3359, Method B, and an unnotched Izod impact strength of 150 to 250 Joules/meter, measured at 23° C. according to ASTM D256; and a paint layer in contact with a surface of the product of injection molding; wherein the paint layer is applied to the product of injection molding by electrostatic painting.

Another embodiment is a composition comprising: 5 to 25 weight percent of a poly(arylene ether), 35 to 63 weight percent of a poly(arylene sulfide), 1.7 to 5 weight percent of an electrically conductive carbon black, and 20 to 50 weight percent of glass fibers; wherein all weight percents are based on the total weight of the composition; wherein the weight ratio of electrically conductive carbon black to poly(arylene sulfide) is at least 0.048; and wherein the composition exhibits a volume resistivity less than or equal to 1,000,000 ohm-centimeters, measured at 23° C. according to ASTM D6095, a paint adhesion rating of at least 3 B measured according to ASTM D3359, Method B, and an unnotched Izod impact strength of at least 150 Joules/meter, measured at 23° C. according to ASTM D256.

These and other embodiments, including methods of preparing the composition and the injection molded article, are described in detail below.

DETAILED DESCRIPTION OF THE INVENTION

The present inventors have discovered that a markedly improved balance of electrostatic paint attraction, paint adhesion, and impact strength is exhibited by an injection molded article, comprising: a product of injection molding a composition comprising 5 to 25 weight percent of a poly(arylene ether), 35 to 63 weight percent of a poly(arylene sulfide), 1.7 to 5 weight percent of an electrically conductive carbon black, and 20 to 50 weight percent of glass fibers; wherein all weight percents are based on the total weight of the composition; wherein the weight ratio of electrically conductive carbon black to poly(arylene sulfide) is at least 0.048; and wherein the composition exhibits a volume resistivity less than or equal to 1,000,000 ohm-centimeters, measured at 23° C. according to ASTM D6095, a paint adhesion rating of at least 3 B measured according to ASTM D3359, Method B, and an unnotched Izod impact strength of at least 150 Joules/meter, measured at 23° C. according to ASTM D256. It is particularly surprising that the limited amount of poly(arylene ether) included in the composition improves paint adhesion and allows a reduction in the conductive carbon black amount without compromising paint attraction. In some embodiments, the composition exhibits a volume resistivity of 100 to 1,000,000 ohm-centimeters, measured at 23° C. according to ASTM D6095, a paint adhesion rating of 3 B or 4 B or 5 B measured according to ASTM D3359, Method B, and an unnotched Izod impact strength of 150 to 250 Joules/meter, specifically 150 to 185 Joules/meter, measured at 23° C. according to ASTM D256.

The article comprises a product of injection molding the composition specified above. Injection molding methods suitable for poly(arylene ether)/poly(arylene sulfide) blends are known in the art. For the specific composition described herein, the present inventors have found that the injection molding conditions can include a barrel temperature of about 250 to about 350° C., specifically about 290 to about 330° C. and a mold temperature of about 100 to about 200° C., specifically about 120 to about 160° C.

The composition comprises a poly(arylene ether). Suitable poly(arylene ether)s include those comprising repeating structural units having the formula wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more heteroatoms such as halogens, oxygen, nitrogen, sulfur, silicon, or phosphorus. When substituted, the hydrocarbyl residue can contain the heteroatoms pendant to or within the backbone of the hydrocarbon residue. As one example, $Z^1$ can be a di-n-butylaminomethyl group formed by reaction of the methyl group of a terminal 1-hydroxy-2,6-dimethylphenylene residue with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

As noted above, the poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a random copolymer, a graft copolymer, an ionomer, or a block copolymer, as well as combinations comprising at least one of the foregoing.

In some embodiments, the intrinsic viscosity of the poly(arylene ether) is about 0.1 to about 1.0 deciliter per gram, measured at 25° C. in chloroform. Specifically the intrinsic viscosity can be about 0.3 to about 0.8, specifically about 0.4 to about 0.6, more specifically about 0.4 to about 0.5. Those skilled in the art understand that intrinsic viscosity of a poly(arylene ether) can increase by up to 30% on melt kneading.

The above intrinsic viscosity range of 0.1 to about 1.0 deciliter per gram is intended to encompass intrinsic viscosities both before and after melt kneading to form the composition. A blend of poly(arylene ether) resins having different intrinsic viscosities can be used.

The composition comprises the poly(arylene ether) in an amount of 5 to 25 weight percent, specifically 8 to 20 weight percent, more specifically 10 to 15 weight percent, all based on the total weight of the composition.

In addition to the poly(arylene ether), the composition comprises a poly(arylene sulfide). Poly(arylene ether)s are a known class of polymers containing arylene groups separated by sulfur atoms. They include poly(phenylene sulfide)s, for example poly(p-phenylene sulfide), and substituted poly(phenylene sulfide)s. Typical poly(arylene ether)s comprise at least 70 mole percent, specifically at least 90 mole percent, more specifically at least 95 mole percent, of recurring para-phenylene sulfide units having the structure When the amount of said recurring units is less than 70 molar %, the heat resistance is somewhat limited. The remaining up to 30 mole percent of recurring units in the poly(arylene sulfide) can, in some embodiments, have a structure selected from wherein $R^1$, $R^2$, $R^3$ and $R^4$ are, independently at each occurrence, hydrogen, halogen, $C_1$-$C_{12}$ hydrocarbyl, $C_1$-$C_{12}$ hydrocarbyloxy, nitro, amino, carboxy, or the like.

The poly(arylene sulfide) can be a linear, branched, or cured polymer, or a mixture of at least two of the foregoing. Linear poly(arylene sulfide)s of relatively low molecular weight may be prepared by, for example, the process disclosed in U.S. Pat. No. 3,354,129 to Edmonds et al. Linear poly(arylene sulfide)s having a relatively high molecular weight may be prepared by, for example, the process disclosed in U.S. Pat. No. 3,919,177 of Campbell. Branched poly(arylene sulfide)s may be prepared by the use of a branching agent, for example, 1,3,5-trichlorobenzene, which is disclosed in U.S. Pat. No. 4,794,164 of Iwasaki et al. The degree of polymerization of the poly(arylene sulfide)s prepared by the process of U.S. Pat. Nos. 3,354,129, 3,919,177 and 4,794,164 can be further increased by heating in an oxygen atmosphere or in the presence of a crosslinking agent such as, for example, a peroxide after polymerization.

The poly(arylene sulfide) can be functionalized or unfunctionalized. If the poly(arylene sulfide) is functionalized, the functional groups can include amino, carboxylic acid, metal carboxylate, disulfide, thiol, and metal thiolate groups. One method for incorporation of functional groups into poly (arylene sulfide) can be found in U.S. Pat. No. 4,769,424 to Takekoshi et al., which discloses incorporation of substituted thiophenols into halogen substituted poly(arylene sulfide)s. Another functionalizing method involves incorporation of chloro-substituted aromatic compounds containing the desired functionality reacted with an alkali metal sulfide and chloroaromatic compounds. A third functionalizing method involves reaction of poly(arylene sulfide) with a disulfide containing the desired functional groups, typically in the melt or in a suitable high boiling solvent such as chloronapthalene.

Though the melt viscosity of PPS used in the present invention is not particularly limited so far as the moldings which can be obtained, a melt viscosity of at least 100 Poise is preferred from the viewpoint of the toughness of PPS per se and that of 10,000 Poise or less is preferred from the viewpoint of the moldability. In some embodiments, the poly (arylene sulfide) can have a melt flow rate less than or equal to 100 grams per 10 minutes measured at 316° C. and 5 kilogram load according to ASTM D1238. Specifically, the melt flow rate can be 50 to 100 grams per 10 minutes.

The poly(arylene sulfide) can also be treated to remove unwanted contaminating ions by immersing the resin in deionized water or by treatment with an acid, typically hydrochloric acid, sulfuric acid, phosphoric acid, or acetic acid. For some product applications, it is preferred to have a very low impurity level, represented as the percent by weight ash remaining after burning a poly(arylene sulfide) sample. Typically the ash content is less than or equal to 1 weight percent, specifically less than or equal to 0.5 weight percent, more specifically less than or equal to 0.1 weight percent.

The composition comprises 35 to 63 weight percent of the poly(arylene sulfide), based on the total weight of the composition. Within this range, the poly(arylene sulfide) amount specifically can be 40 to 55 weight percent, more specifically 43 to 50 weight percent.

In addition to the poly(arylene ether) and the poly(arylene sulfide), the composition comprises an electrically conductive carbon black. Electrically conductive carbon blacks are commercially available and are sold under a variety of trade names, including S.C.F. (Super Conductive Furnace), E.C.F. (Electric Conductive Furnace), Ketjen Black EC (available from Akzo Co., Ltd.) or acetylene black. In some embodiments the electrically conductive carbon black has an average particle size less than or equal to 200 nanometers (nm), specifically less than or equal to 100 nm, more specifically less than or equal to 50 nm. The electrically conductive carbon black may also have surface areas greater than 200 square meters per gram ($m^2$/g), specifically greater than 400 $m^2$/g, more specifically, greater than 1,000 $m^2$/g. The electrically conductive carbon black may have a pore volume greater than or equal to 40 cubic centimeters per hundred grams ($cm^3$/100 g), specifically, greater than or equal to 100 $cm^3$/100 g, more specifically, greater than or equal to 150 $cm^3$/100 g, as determined by dibutyl phthalate absorption. In some embodiments, the electrically conductive carbon black has a BET surface area of at least 1,000 $meter^2$/gram, specifically 1,000 to 3,000 $meter^2$/gram, more specifically 1,000 to 2,000 $meter^2$/gram. BET surface area can be measured according to ASTM D6556-04, "Standard Test Method for Carbon Black-Total and External Surface Area by Nitrogen Adsorption".

Electrically conductive carbon black particles form aggregates, which are clusters of carbon black particles that are strongly attached to one another by physical forces such as van der Waals forces. The aggregates in turn can cluster in agglomerates, which are held together by weaker forces and can be decreased in size by forces such as shear present during the formation and processing of a thermoplastic composition.

The composition contains the electrically conductive carbon black in an amount of 1.7 to 5 weight percent, specifically 2 to 4 weight percent, more specifically 2 to 3 weight percent, based on the total weight of the composition. The present inventors have observed that the weight ratio of electrically conductive carbon black to poly(arylene sulfide) is critical to achieving the desired properties of the composition. Thus, the weight ratio of electrically conductive carbon black to poly (arylene sulfide) is at least 0.048, specifically 0.048 to 0.07, more specifically 0.048 to 0.06.

In some embodiments, it is possible to substitute carbon nanotubes for part or all of the electrically conductive carbon black. Suitable carbon nanotubes include single-wall carbon nanotubes and multi-wall carbon nanotubes. In some embodiments, the carbon nanotubes have a length of about 0.1 to 5 millimeters and a diameter of about 1 to 10 micrometers. In some embodiments, the carbon nanotubes are provided in the form of agglomerates of carbon nanotubes, wherein the agglomerates have an aspect ratio of at least 5 and an average diameter of about 3.5 to about 500 nanometers as described, for example, in U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al. When carbon nanotubes are substituted for part or all of the electrically conductive carbon black, they can be used in an amount of about 0.01 to about 0.05 weight percent, based on the total weight of the composition.

In addition to the poly(arylene ether), the poly(arylene sulfide), and the electrically conductive carbon black, the composition comprises glass fibers. Suitable glass fibers include those based on E, A, C, ECR, R, S, D, and NE glasses, as well as quartz. The glass fiber can have a diameter of about 2 to about 30 micrometers, specifically about 5 to about 25 micrometers, more specifically about 10 to about 15 micrometers. The length of the glass fibers before compounding can be about 2 to about 7 millimeters, specifically about 3 to about 5 millimeters. The glass fiber can, optionally, include a so-called adhesion promoter to improve its compatibility with the thermoplastic composition. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville. The composition comprises the glass fibers in an amount of 20 to 50 weight percent, specifically 30 to 45 weight percent, more specifically 35 to 45 weight percent, based on the total weight of the composition.

In addition to the poly(arylene ether), the poly(arylene sulfide), the electrically conductive carbon black, and the glass fibers, which are all required components, the composition can, optionally, further comprise additional components. One such optional component is a compatibilizer for the poly(arylene ether) and the poly(arylene sulfide), which, when present, is typically used in an amount of 0.2 to 5 weight percent, specifically 0.5 to 3 weight percent, more specifically 1 to 2 weight percent, based on the total weight of the composition. Representative compatibilizers are described, for example, the polycarboxylic acid compounds and derivatives described in U.S. Pat. No. 5,290,881 to Dekkers, the ortho ester functional poly(phenylene ether) resins described in U.S. Pat. No. 5,612,401 to Brown et al., and the ortho ester and epoxy compounds described in U.S. Pat. Nos. 5,612,401 and 5,837,758 to Brown et al. In some embodiments, the compatibilizer is citric acid.

In some embodiments, the composition comprises no compatibilizer. Although use of a compatibilizer in a blend comprising a major amount of poly(arylene sulfide) and a minor amount of poly(arylene ether) typically produces a finer dispersion of the poly(arylene ether) phase in the poly(arylene sulfide) phase, which in turn would be expected to improve the physical properties of the blend, the present inventors have observed, surprisingly, that the physical properties of uncompatibilized blends are typically superior to those of blends compatibilized with citric acid. Thus, in some embodiments, the composition comprises a continuous phase comprising the poly(arylene sulfide) and a dispersed phase comprising the poly(arylene ether), wherein the dispersed phase has an equivalent circular diameter of 2 to 10 micrometers, specifically 2 to 5 micrometers. These dispersed phase particle sizes are characteristic of an uncompatibilized blend.

Another optional component is a processing aid. The processing aid is a liquid at 25° C. and one atmosphere. Illustrative processing aids include triaryl phosphates (including, for example, resorcinol bis(diphenyl phosphate) and bisphenol A bis(diphenyl phosphate)), polyolefins, polytetrafluoroethylenes, mineral oil, and the like, and mixtures thereof. When present, the processing aid is typically used in an amount of 1 to 10 weight percent, specifically 2 to 5 weight percent.

The triaryl phosphates that may be used as processing aids can also function as flame retardants. Other classes of flame retardants that can, optionally, be included in the composition include, for example, triaryl phosphine oxides (such as triphenyl phosphine oxide), melamine type flame retardants (such as melamine borate, melamine phosphate, melamine pyrophosphate, and melamine polyphosphate), metal dialkylphosphinates (such as aluminum tris(diethylphosphinate)), metal hydroxides and hydrates (such as alumina trihydrate), and the like, and combinations thereof. In some embodiments, the flame retardant is resorcinol bis(diphenyl phosphate). When present, the flame retardant is typically used in an amount of 1 to 10 weight percent, specifically 2 to 5 weight percent.

The composition can exclude components not expressly taught herein as required or optional. For example, the composition can be free of any thermoplastic resin other than the poly(arylene ether) and the poly(arylene sulfide). As another example, the composition can be free of impact modifiers. As another example, the composition can be free of any thermoset resin. As another example, the composition can be free of any electrically conductive filler other than the electrically conductive carbon black.

The composition is particularly suited for painting. Thus, one embodiment is an article comprising a product of injection molding the composition, and a paint layer in contact with a surface of the product of injection molding. In some embodiments, the paint layer is applied to the product of injection molding by electrostatic painting. Materials and methods of electrostatic painting are known in the art and described, for example, in Bob Utech, "A Guide to High-performance Powder Coating", Copyright 2002 by the Society of Manufacturing Engineers, ISBN 0-87263-547-3.

The composition is useful for forming various injection molded articles including, for example, lighting housings (including incandescent and fluorescent lighting housings), home-appliance components and housings, motor housings, underground electrical boxes, and automotive under-the-hood enclosures, as well as various other components that may come into contact with fuel and/or elevated temperatures.

One embodiment is a painted injection molded article, comprising: a product of injection molding a composition comprising 8 to 15 weight percent of a poly(arylene ether), 40 to 50 weight percent of a poly(arylene sulfide), 2 to 3 weight percent of an electrically conductive carbon black, and 35 to 45 weight percent of glass fibers; wherein all weight percents are based on the total weight of the composition; wherein the weight ratio of electrically conductive carbon black to poly(arylene sulfide) is 0.048 to 0.07; and wherein the composition exhibits a volume resistivity of 100 to 100,000 ohm-centimeters, measured at 23° C. according to ASTM D6095, a paint adhesion rating of 3 B or 4 B or 5 B measured according to ASTM D3359, Method B, and an unnotched Izod impact strength of 150 to 250 Joules/meter, measured at 23° C. according to ASTM D256; and a paint layer in contact with a surface of the product of injection molding; wherein the paint layer is applied to the product of injection molding by electrostatic painting. The composition used for injection molding can further comprise 2 to 5 weight percent resorcinol bis(diphenyl phosphate). The composition can, optionally, be free of a compatibilizing agent for the poly(arylene ether) and the poly(arylene sulfide).

Another embodiment is a composition comprising: 5 to 25 weight percent of a poly(arylene ether), 35 to 63 weight percent of a poly(arylene sulfide), 1.7 to 5 weight percent of an electrically conductive carbon black, and 20 to 50 weight percent of glass fibers; wherein all weight percents are based on the total weight of the composition; wherein the weight ratio of electrically conductive carbon black to poly(arylene sulfide) is at least 0.048; and wherein the composition exhibits a volume resistivity less than or equal to 1,000,000 ohm-centimeters, measured at 23° C. according to ASTM D6095, a paint adhesion rating of at least 3 B measured according to ASTM D3359, Method B, and an unnotched Izod impact strength of at least 150 Joules/meter, measured at 23° C. according to ASTM D256. In some embodiments, the composition exhibits a volume resistivity of 100 to 1,000,000 ohm-centimeters, measured at 23° C. according to ASTM D6095, a paint adhesion rating of 3 B or 4 B or 5 B measured according to ASTM D3359, Method B, and an unnotched Izod impact strength of 150 to 250 Joules/meter, measured at 23° C. according to ASTM D256. In some embodiments, the composition further comprises 2 to 5 weight percent resorcinol bis(diphenyl phosphate). In some embodiments, the composition is free of a compatibilizing agent for the poly(arylene ether) and the poly(arylene sulfide).

Another embodiment is a composition comprising: 8 to 15 weight percent of a poly(arylene ether), 40 to 50 weight percent of a poly(arylene sulfide), 2 to 3 weight percent of an electrically conductive carbon black, and 20 to 45 weight percent of glass fibers; wherein all weight percents are based on the total weight of the composition; wherein the weight ratio of electrically conductive carbon black to poly(arylene sulfide) is 0.048 to 0.07; and wherein the composition exhibits a volume resistivity of 100 to 100,000 ohm-centimeters, measured at 23° C. according to ASTM D6095, a paint adhesion rating of 3 B or 4 B or 5 B measured according to ASTM D3359, Method B, and an unnotched Izod impact strength of 150 to 250 Joules/meter, measured at 23° C. according to ASTM D256. In some embodiments, the composition further comprises 2 to 5 weight percent resorcinol bis(diphenyl phosphate). In some embodiments, the composition is free of a compatibilizing agent for the poly(arylene ether) and the poly(arylene sulfide).

Another embodiment is a method of preparing a composition, comprising: melt kneading 5 to 25 weight percent of a poly(arylene ether), 35 to 63 weight percent of a poly(arylene sulfide), 1.7 to 5 weight percent of an electrically conductive carbon black, and 20 to 50 weight percent of glass fibers to form the composition; wherein all weight percents are based on the total weight of the composition; wherein the weight ratio of electrically conductive carbon black to poly(arylene sulfide) is at least 0.048; and wherein the composition exhibits a volume resistivity less than or equal to 1,000,000 ohm-centimeters, measured at 23° C. according to ASTM D6095, a paint adhesion rating of at least 3 B measured according to ASTM D3359, Method B, and an unnotched Izod impact strength of at least 150 Joules/meter, measured at 23° C. according to ASTM D256. In some embodiments, the method further comprises melt kneading 2 to 5 weight percent resorcinol bis(diphenyl phosphate) with the poly(arylene ether), the poly(arylene sulfide), the electrically conductive carbon black, and the glass fibers. In some embodiments, the composition is free of a compatibilizing agent for the poly(arylene ether) and the poly(arylene sulfide).

The present inventors have discovered that improved processing and properties of the composition can be achieved when the composition is formed in an extruder, and the poly (arylene sulfide) is added in at least two portions, one upstream with all components except the glass fibers, and one downstream with the glass fibers. Thus, in some embodiments, the method comprises melt kneading in an extruder; wherein the melt kneading comprises melt kneading the poly (arylene ether), the electrically conductive carbon black, and a first portion of the poly(arylene sulfide) to form a first blend; and melt kneading the first blend with the glass fibers and a second portion of the poly(arylene sulfide). In some embodiments, the first portion of the poly(arylene sulfide) is in the form of a powder, and the second portion of the poly(arylene sulfide) is in the form of pellets.

The invention is further illustrated by the following non-limiting examples.

EXAMPLES 1 AND 2

Comparative Examples 1-6

These examples illustrate the preparation of poly(arylene ether)/poly(arylene sulfide) blends exhibiting good paint attraction, good paint adhesion, and good impact strength. They also illustrate the property effects of varying the weight ratio of conductive carbon black to poly(arylene sulfide), and the effects of varying the poly(arylene ether) concentration.

Components used to prepare the blends are described in Table 1.

TABLE 1

| Material | Description |
| --- | --- |
| PPE | Poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from GE Plastics |
| PPS | Poly(phenylene sulfide), CAS Reg. No. 26125-40-6, having a melt flow rate of 75 grams per 10 minutes measured at 316° C. and 5 kilogram load according to ASTM D1238; obtained in powder form as RYTON PPS P-4 from Chevron Phillips, or used as pellets formed by extrusion and pelletization of the powder |
| CA | Citric acid, CAS Reg. No. 77-92-9 |
| Glass | E-Glass fibers having a diameter of about 11 micrometers and a pre-compounded length of about 4 millimeters; obtained as 173X-11C 4MM from Owens Corning |
| CCB | Conductive carbon black having a BET surface area of about 1,400 meter$^2$/gram measured according to ASTM D6556; obtained as Ketjen EC600-JD from Akzo Nobel. |
| Antioxidant | Octadecyl-3-(3,5-di-tert-butyl-4-hydroxyphenyl)propionate (CAS Reg. No. 2082-79-3); obtained as Great Lakes Anox PP18, Everspring Evernox 76, or Ciba Irganox 1076; |
| Stabilizer | Mixture of phosphonous acid esters (CAS Reg. No. 119345-01-6); obtained as Clariant Sandostab PEPQ or Ciba Irgafos PEPQ |
| RDP | Resorcinol bis(diphenyl phosphate), CAS Reg. No. 57583-54-7, obtained as RDP Flame Retardant from Supresta |

The components as indicated in Table 2 were extrusion compounded in the indicated quantities (expressed in parts by weight) in a 30-millimeter, nine-zone, twin-screw extruder at a screw rotation rate of 325 rotations per minute and zone temperatures of 240° C. for zone 1, 260° C. for zone 2, 280° C. for zones 3-9, and 290° C. for the die.

Articles were injection molded using a barrel temperature of 310° C. and a mold temperature of 140° C. The samples used for paint tests had dimensions of 12.7 centimeters (5 inches) by 12.7 centimeters (5 inches) by 0.32 centimeters (0.125 inches).

Volume resistivities were measured at 23° C. according to ASTM D6095-06. Means and standard deviations for the volume resistivity values in Table 2 reflect measurements on five samples per composition.

Paint attraction was evaluated by visual inspection as PPG Envirocron Powder Coating, PCV70118 Low Film Anti-Chip polyurethane Grey, was applied. Parts to be painted were first rinsed with isopropyl alcohol to remove oils and dust. Parts were then suspended in a ventilated hood, connected by metal clips to "ground," and subsequently sprayed with the conductive paint using a Nordson Econo Coat System, Model No. ECVC 3400. Applying a voltage of about 95 kilovolts between the tip of the spray gun and a suspended part electronically connected to ground caused the charged paint particles to be attracted to the conductive part. All painted parts were then placed in an oven at 200° C. for 30 minutes to cure the paint to the surface of the part.

Notched and unnotched Izod impact strength values, expressed in Joules/meter ($J/m^2$), were measured at 23° C. according to ASTM D256-06a.

Paint attraction was evaluated as described above. Paint adhesion ratings were determined according to ASTM D3359-02, Method B, using a paint curing condition of 300 minutes at 200° C., and Scotch 898 tape.

TABLE 2

|  | C. Ex. 1 | C. Ex. 2 | C. Ex. 3 | C. Ex. 4 |
|---|---|---|---|---|
| PPE | 20 | 20.26 | 30 | 30.26 |
| PPS | 75 | 76.1 | 65 | 66.1 |
| CA | 1.33 | — | 1.33 | — |
| CCB | 3.34 | 3.34 | 3.34 | 3.34 |
| Glass | — | — | — | — |
| Antioxidant | 0.33 | 0.3 | 0.33 | 0.3 |
| CCB/PPS | 0.0445 | 0.0439 | 0.0514 | 0.0505 |
| Volume Resistivity (ohm-cm) | $(1.0 \pm 0.7) \times 10^7$ | $(2.0 \pm 0.8) \times 10^7$ | $(2.6 \pm 0.3) \times 10^4$ | $(3.6 \pm 1.7) \times 10^4$ |
| Paint attraction | No | No | Yes | Yes |
|  | C. Ex. 5 | C. Ex. 6 | Ex. 1 | Ex. 2 |
| PPE | 40 | 40.26 | 17 | 22 |
| PPS | 55 | 56.1 | 40.8 | 45.8 |
| CA | 1.33 | — | — | — |
| CCB | 3.34 | 3.34 | 2 | 2 |
| Glass | — | — | 40 | 40 |
| Antioxidant | 0.33 | 0.3 | 0.2 | 0.2 |
| CCB/PPS | 0.0607 | 0.0595 | 0.0490 | 0.0559 |
| Volume Resistivity (ohm-cm) | $(1.2 \pm 0.2) \times 10^3$ | $(4.7 \pm 1.1) \times 10^2$ | $(2.0 \pm 0.3) \times 10^5$ | $(1.02 \pm 0.05) \times 10^3$ |
| Paint attraction | Yes | Yes | No | Yes |

By comparing the volume resistivity values in Table 2 with electrostatic painting results, it was determined that weight ratios of conductive carbon black to poly(arylene sulfide) greater than or equal to 0.048 were associated with good paint attraction during electrostatic painting, whereas weight ratios less than 0.048 were associated with poor paint attraction. Also, comparison of painting results for Comparative Examples 4-6 indicated that an increase in carbon black concentration coupled with an increase in poly(arylene ether) improved the paint attraction of the composition.

EXAMPLES 3-7

Comparative Examples 7-12

These examples illustrate the effects of varying concentrations of conductive carbon black and poly(arylene ether), as well as the preparation of compositions exhibiting the desired combination of low resistivity, good paint attraction, good paint adhesion, and good impact strength.

The compositions, summarized in Table 3, were compounded as described above.

TABLE 3

|  | C. Ex. 7 | C. Ex. 8 | C. Ex. 9 | C. Ex. 10 |
|---|---|---|---|---|
| PPE | — | — | 5 | 12 |
| PPS | 58 | 56.5 | 52 | 45 |
| CCB | 2 | 3.5 | 2 | 2 |
| Glass | 40 | 40 | 40 | 40 |
| Stabilizer | — | — | 1 | 1 |
| CCB/PPS | 0.0345 | 0.0619 | 0.0385 | 0.0444 |
| Paint attraction | No | Yes | No | No |
| Paint adhesion rating | — | 1B | — | — |
| Notched Izod (J/m) | 63.5 | 54.5 | 55.4 | 53 |
| Unnotched Izod (J/m) | 303 | 220 | 208 | 188 |
|  | Ex. 3 | Ex. 4 | Ex. 5 | Ex. 6 |
| PPE | 17 | 22 | 12 | 8 |
| PPS | 40 | 35 | 44.5 | 48.3 |
| CCB | 2 | 2 | 2.5 | 2.7 |
| Glass | 40 | 40 | 40 | 40 |
| Stabilizer | 1 | 1 | 1 | 1 |
| CCB/PPS | 0.0500 | 0.0571 | 0.0562 | 0.0559 |
| Paint attraction | Yes | Yes | Yes | Yes |
| Paint adhesion rating | 3B | 4B | 3B | 3B |
| Notched Izod ($J/m^2$) | 45.9 | 45 | 55.5 | 79.9 |
| Unnotched Izod ($J/m^2$) | 166 | 156 | 180 | 182 |
|  | Ex. 7 | C. Ex. 11 | C. Ex. 12 |  |
| PPE | 6 | 3 | 1 |  |
| PPS | 50.2 | 53.1 | 55 |  |

TABLE 3-continued

| CCB | 2.8 | 2.9 | 3.1 |
|---|---|---|---|
| Glass | 40 | 40 | 40 |
| Stabilizer | 1 | 1 | 1 |
| CCB/PPS | 0.0558 | 0.0546 | 0.0564 |
| Paint attraction | Yes | Yes | Yes |
| Paint adhesion rating | 4B | 3B | 2B |
| Notched Izod (J/m$^2$) | 43.1 | 46.1 | 46.5 |
| Unnotched Izod (J/m$^2$) | 179 | 165 | 188 |

The property results in Table 3 indicate that increasing conductive carbon black content is associated with an increase in brittleness (a decrease in impact strength). For example, increasing the conductive carbon black level from 2 weight percent in Comparative Example 7 to 3.5 weight percent in Comparative Example 8 was associated with a decrease in notched Izod impact strength from 63.5 to 54.5 Joules/meter, and a decrease in unnotched Izod impact strength from 303 to 220 Joules/meter. Comparative Example 1 did not contain enough conductive carbon black to attract paint to the molded part. Comparative Example 2 had enough conductive carbon black to attract paint, but the paint did not adhere well after curing.

The results in Table 3 also show that addition of poly (arylene ether) improves paint adhesion after curing. While not providing a rigorous comparison, Example 7 and Comparative Example 11 and Comparative Example 12 differ primarily in their poly(arylene ether) concentrations, with higher poly(arylene ether) concentrations being compensated by lower poly(arylene sulfide) concentrations. Results for these compositions indicate that a poly(arylene ether) amount of 6 weight percent (Example 7) is associated with significantly improved paint adhesion compared to poly(arylene ether) amounts of 3 weight percent (Comparative Example 11) and 1 weight percent (Comparative Example 12). Any reduction in impact strength associated with increased poly (arylene ether) levels can be compensated by reducing the level of conductive carbon black, while still maintaining good paint attraction.

To summarize, these results show that compositions having the specific component amounts described herein provide a previously unavailable combination of low volume resistivity, good paint attraction during painting, good paint adhesion after curing, and good impact strength.

EXAMPLES 8 AND 9

Comparative Example 13

These examples further illustrate the improved paint adhesion associated with addition of poly(arylene ether) to the composition.

Figure 1:
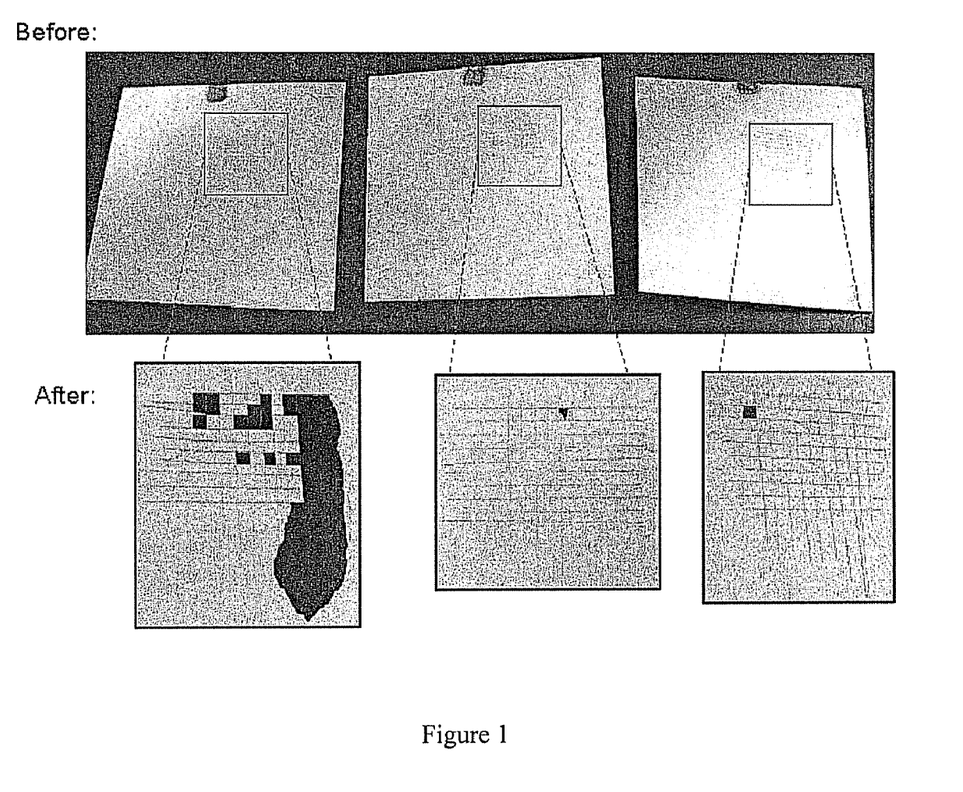
FIG. 1 shows photographic images from a paint adhesion test; the top row shows painted samples before tape adhesion and removal, and the bottom row shows the same samples after tape removal; from left to right, the molded compositions correspond to Comparative Example 13, Example 8, and Example 9.

Compositions are summarized in Table 4 and were compounded and molded as described above. Paint adhesion testing was conducted as described above. FIG. 1 shows scored painted samples before (top) and after (bottom) tape removal. The compositions, left to right, are those of Comparative Example 13, Example 8, and Example 9. Comparative Example 13, which lacked poly(arylene ether), had an ASTM D3359-02 paint adhesion rating of 1 B. Examples 8 and 9, containing poly(arylene ether), both had an ASTM D3359-02 paint adhesion rating of 4 B.

TABLE 4

|  | C. Ex. 13 | Ex. 8 | Ex. 9 |
|---|---|---|---|
| PPE | 17 | 22 | — |
| PPS | 40 | 35 | 56.5 |
| CCB | 3.5 | 2 | 2 |
| Glass | 40 | 40 | 40 |
| Stabilizer | — | 0.2 | 0.2 |
| CA | — | 0.8 | 0.8 |
| Paint adhesion rating | 1B | 4B | 4B |

EXAMPLE 10

This example illustrates another inventive composition. The components and amounts are listed in Table 5. The poly (arylene ether), 16.60 parts by weight of poly(arylene sulfide) powder, the stabilizer, the conductive carbon black, and the flame retardant were added to the extruder upstream. The poly(arylene sulfide) pellets and the glass fibers were added to the extruder downstream.

TABLE 5

|  | Ex. 10 |
|---|---|
| PPE | 12.00 |
| PPS | 16.60 |
| CCB | 2.20 |
| Stabilizer | 0.20 |
| RDP | 4.00 |
| Glass | 40.00 |
| PPS pellet | 25.00 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:
1. A composition comprising:
5 to 25 weight percent of a poly(arylene ether),

35 to 63 weight percent of a poly(arylene sulfide),
1.7 to 5 weight percent of an electrically conductive carbon black, and
20 to 50 weight percent of glass fibers;
wherein all weight percents are based on the total weight of the composition;
wherein the weight ratio of electrically conductive carbon black to poly(arylene sulfide) is at least 0.048; and
wherein the composition exhibits
a volume resistivity less than or equal to 1,000,000 ohm-centimeters, measured at 23° C. according to ASTM D6095,
a paint adhesion rating of at least 3 B measured according to ASTM D3359, Method B, and
an unnotched Izod impact strength of at least 150 Joules/meter, measured at 23° C. according to ASTM D256.

2. The composition of claim 1, wherein the composition exhibits
a volume resistivity of 100 to 1,000,000 ohm-centimeters, measured at 23° C. according to ASTM D6095,
a paint adhesion rating of 3 B or 4 B or 5 B measured according to ASTM D3359, Method B, and
an unnotched Izod impact strength of 150 to 250 Joules/meter, measured at 23° C. according to ASTM D256.

3. The composition of claim 1, wherein the composition further comprises 2 to 5 weight percent of a processing aid that is a liquid at 25° C. and one atmosphere and that is selected from the group consisting of triaryl phosphates, polyolefins, polytetrafluoroethylenes, mineral oil, and mixtures thereof.

4. The composition of claim 1, wherein the composition is free of a compatibilizing agent for the poly(arylene ether) and the poly(arylene sulfide).

5. The composition of claim 1,
wherein the composition comprises
8 to 15 weight percent of the poly(arylene ether),
40 to 50 weight percent of the poly(arylene sulfide),
2 to 3 weight percent of the electrically conductive carbon black, and
20 to 45 weight percent of the glass fibers;
wherein the weight ratio of electrically conductive carbon black to poly(arylene sulfide) is 0.048 to 0.07; and
wherein the composition exhibits
a volume resistivity of 100 to 100,000 ohm-centimeters, measured at 23° C. according to ASTM D6095,
a paint adhesion rating of 3 B or 4 B or 5 B measured according to ASTM D3359, Method B, and
an unnotched Izod impact strength of 150 to 250 Joules/meter, measured at 23° C. according to ASTM D256.

6. The composition of claim 5, wherein the composition further comprises 2 to 5 weight percent of a processing aid that is a liquid at 25° C. and one atmosphere and that is selected from the group consisting of triaryl phosphates, polyolefins, polytetrafluoroethylenes, mineral oil, and mixtures thereof.

7. The composition of claim 5, wherein the composition is free of a compatibilizing agent for the poly(arylene ether) and the poly(arylene sulfide).

8. An injection molded article, comprising:
a product of injection molding a composition comprising
5 to 25 weight percent of a poly(arylene ether),
35 to 63 weight percent of a poly(arylene sulfide),
1.7 to 5 weight percent of an electrically conductive carbon black, and
20 to 50 weight percent of glass fibers;
wherein all weight percents are based on the total weight of the composition;
wherein the weight ratio of electrically conductive carbon black to poly(arylene sulfide) is at least 0.048; and
wherein the composition exhibits
a volume resistivity less than or equal to 1,000,000 ohm-centimeters, measured at 23° C. according to ASTM D6095,
a paint adhesion rating of at least 3 B measured according to ASTM D3359, Method B, and
an unnotched Izod impact strength of at least 150 Joules/meter, measured at 23° C. according to ASTM D256.

9. The injection molded article of claim 8, wherein the composition exhibits
a volume resistivity of 100 to 1,000,000 ohm-centimeters, measured at 23° C. according to ASTM D6095,
a paint adhesion rating of 3 B or 4 B or 5 B measured according to ASTM D3359, Method B, and
an unnotched Izod impact strength of 150 to 250 Joules/meter, measured at 23° C. according to ASTM D256.

10. The injection molded article of claim 8, wherein the weight ratio of electrically conductive carbon black to poly(arylene sulfide) is 0.048 to 0.07.

11. The injection molded article of claim 8, wherein the electrically conductive carbon black has a BET surface area of at least 1,000 meter$^2$/gram.

12. The injection molded article of claim 8, wherein the composition further comprises 0.2 to 5 weight percent of a compatibilizer for the poly(arylene ether) and the poly(arylene sulfide).

13. The injection molded article of claim 12, wherein the compatibilizer is citric acid.

14. The injection molded article of claim 8, wherein the composition further comprises 2 to 5 weight percent of a processing aid that is a liquid at 25° C. and one atmosphere and that is selected from the group consisting of triaryl phosphates, polyolefins, polytetrafluoroethylenes, mineral oil, and mixtures thereof.

15. The injection molded article of claim 8, wherein the composition is free of a compatibilizing agent for the poly(arylene ether) and the poly(arylene sulfide).

16. The injection molded article of claim 8, comprising a continuous phase comprising the poly(arylene sulfide) and a dispersed phase comprising the poly(arylene ether); wherein the dispersed phase has an equivalent circular diameter of 2 to 10 micrometers.

17. The injection molded article of claim 8, further comprising a paint layer in contact with a surface of the product of injection molding.

18. The injection molded article of claim 17, wherein the paint layer is applied to the product of injection molding by electrostatic painting.

19. A painted injection molded article, comprising:
a product of injection molding a composition comprising
8 to 15 weight percent of a poly(arylene ether),
40 to 50 weight percent of a poly(arylene sulfide),
2 to 3 weight percent of an electrically conductive carbon black, and
35 to 45 weight percent of glass fibers;
wherein all weight percents are based on the total weight of the composition; wherein the weight ratio of electrically conductive carbon black to poly(arylene sulfide) is 0.048 to 0.07; and wherein the composition exhibits
a volume resistivity of 100 to 100,000 ohm-centimeters, measured at 23° C. according to ASTM D6095,
a paint adhesion rating of 3 B or 4 B or 5 B measured according to ASTM D3359, Method B, and an unnotched Izod impact strength of 150 to 250 Joules/meter, measured at 23° C. according to ASTM D256; and a paint layer in contact with a surface of the product of injection molding;

wherein the paint layer is applied to the product of injection molding by electrostatic painting.

20. The painted injection molded article of claim 19, wherein the composition further comprises 2 to 5 weight percent of a processing aid that is a liquid at 25° C. and one atmosphere and that is selected from the group consisting of triaryl phosphates, polyolefins, polytetrafluoroethylenes, mineral oil, and mixtures thereof.

21. The painted injection molded article of claim 19, wherein the composition is free of a compatibilizing agent for the poly(arylene ether) and the poly(arylene sulfide).

* * * * *